United States Patent
Xu et al.

(10) Patent No.: US 9,693,219 B2
(45) Date of Patent: Jun. 27, 2017

(54) USER PROFILE CONVERSION TO SUPPORT ROAMING

(71) Applicant: iBasis, Inc., Lexington, MA (US)

(72) Inventors: Richard H. Xu, Wakefield, MA (US); Hwan Jang Tang, Concord, MA (US)

(73) Assignee: iBasis, Inc., Lexington, MA (US)

( * ) Notice: Subject to any disclaimer, the term of this patent is extended or adjusted under 35 U.S.C. 154(b) by 33 days.

(21) Appl. No.: 14/523,133

(22) Filed: Oct. 24, 2014

(65) Prior Publication Data

US 2016/0119773 A1  Apr. 28, 2016

(51) Int. Cl.
  *H04Q 7/10*  (2006.01)
  *H04W 8/14*  (2009.01)
  (Continued)

(52) U.S. Cl.
  CPC ......... *H04W 8/14* (2013.01); *H04M 15/8038* (2013.01); *H04W 8/12* (2013.01);
  (Continued)

(58) Field of Classification Search
  CPC ......... H04W 4/021; H04W 8/02; H04W 8/08; H04W 8/18
  (Continued)

(56) References Cited

U.S. PATENT DOCUMENTS 7,873,358 B2  1/2011  Jiang
7,929,953 B2  4/2011  Jiang
(Continued)

FOREIGN PATENT DOCUMENTS

| WO | WO 2012/050261 A1 | 4/2012 |
|---|---|---|
| WO | WO 2014/160978 A1 | 10/2014 |
| WO | WO 2016/065126 | 4/2016 |

OTHER PUBLICATIONS

3GPP TS 29.305, V12.0.0, 3rd Generation Partnership Project; Technical Specification Group Core Network and Terminals; InterWorking Function (IWF) Between MAP Based and Diameter Based Interfaces (Release 12), pp. 1-98, (Sep. 2013).

(Continued)

*Primary Examiner* — Ajit Patel
*Assistant Examiner* — Julio Perez
(74) *Attorney, Agent, or Firm* — Hamilton, Brook, Smith & Reynolds, P.C.

(57) ABSTRACT

In an example embodiment, a method includes receiving, from a visited network having a first wireless network type, a first update location request message according to a first signaling protocol, the first message associated with a user equipment roaming at the visited network. The first message is converted to a second update location request message according to a second signaling protocol and transmitted to a home network associated with the user equipment, the home network having a second wireless network type. An update location response message according to the second protocol is received from the home network, the update location response message including a user profile associated with the second network type. A combined user profile is generated based on a user profile associated with the first network type and the user profile associated with the second network type. The combined user profile is transmitted to the visited network in an update location answer message according to the first protocol.

19 Claims, 5 Drawing Sheets

(51) Int. Cl.
  *H04W 8/12*    (2009.01)
  *H04M 15/00*   (2006.01)
  *H04W 36/14*   (2009.01)
  *H04W 64/00*   (2009.01)
  *H04W 8/18*    (2009.01)
  *H04W 8/20*    (2009.01)

(52) U.S. Cl.
  CPC ......... *H04W 36/14* (2013.01); *H04W 64/003* (2013.01); *H04M 2215/34* (2013.01); *H04W 8/18* (2013.01); *H04W 8/20* (2013.01)

(58) Field of Classification Search
  USPC ................................ 455/432.1, 432.2, 432.3
  See application file for complete search history.

(56) References Cited

U.S. PATENT DOCUMENTS

| | | | |
|---|---|---|---|
| 8,023,658 | B2 | 9/2011 | Yang et al. |
| 8,219,064 | B2 | 7/2012 | He |
| 8,452,278 | B2 | 5/2013 | Tian et al. |
| 8,611,949 | B2 | 12/2013 | Xu et al. |
| 8,626,157 | B2 | 1/2014 | Nas et al. |
| 8,638,936 | B2 | 1/2014 | Suh et al. |
| 8,645,695 | B2 | 2/2014 | Buckley et al. |
| 8,656,169 | B2 | 2/2014 | He |
| 8,923,853 | B1* | 12/2014 | Shaw .............. H04W 8/12 455/432.1 |
| 8,948,750 | B1* | 2/2015 | Carames ............. H04W 8/12 455/418 |
| 2005/0043037 | A1* | 2/2005 | Ioppe ................ H04W 4/02 455/456.1 |
| 2011/0021216 | A1* | 1/2011 | Pudney ............. H04W 4/12 455/466 |
| 2011/0075675 | A1 | 3/2011 | Koodli et al. |
| 2011/0195710 | A1* | 8/2011 | Nas et al. ......... H04W 8/18 455/432.3 |
| 2013/0157620 | A1 | 6/2013 | Marsico |
| 2013/0311630 | A1 | 11/2013 | Chastain |

OTHER PUBLICATIONS

3GPP TS 29.305, V8.0.0, 3$^{rd}$ Generation Partnership Project; Technical Specification Group Core Network and Terminals; InterWorking Function (IWF) Between MAP Based and Diameter Based Interfaces (Release 8), pp. 1-53, (Dec. 2008).

LTE and EPC Roaming Guidelines, Version 10.0, GSMA™, GSM Association Official Document IR.88 —LTE Roaming Guidelines, pp. 1-68, (Jul. 10, 2013).

International Search Report and Written Opinion for Int'l Application No. PCT/US2015/056878, titled: User Profile Conversion to Support Roaming Inside a Diameter Network, Date Mailed: Jan. 19, 2016.

Product Brief, "Diameter Signaling Evolved," Ulticom D7G, pp. 1-2, UDPB-1013 (2014).

* cited by examiner

USER PROFILE CONVERSION TO SUPPORT ROAMING

BACKGROUND

Wireless communications systems such as the Long Term Evolution (LTE) mobile communications system, also referred to as Evolved Packet System (EPS) or 4th Generation (4G) system, the Global System for Mobile (GSM) communications, or the Wideband Code Division Multiple Access (W-CDMA) mobile communications system, typically enable roaming services. Network operators of such wireless communications systems offer roaming services to roaming users visiting from other networks, thereby allowing the roamers to stay connected even as they travel to different regions or countries.

SUMMARY

Roaming services for 4G mobile networks are usually employed between two or more 4G networks between visited and home networks. However, due to a variety of reasons, some home networks may not be able to upgrade to or launch the 4G network, or their 3G network is not compatible with the 3G network in the visited network.

Such lack of 4G infrastructure at the home network limits its roamers with 4G-capable phones to access 4G visited networks. For example, a 4G-capable handset from a roamer whose home network does not offer 4G network may sense the 4G radio from a 4G visited network and attempt to access the 4G network as the handset is capable of handling 4G signaling and associated procedures. The visited 4G network would first take the access request from the handset, and try to involve an associated 4G mobility management procedure to first authenticate the roamer, and then reject the request due to incompatible signaling protocol between the 4G visited network and the home 3G network (e.g., the MME from the 4G network using Diameter IP protocol for mobility management and 3G HLR at home network only understanding MAP/SS7 protocol for mobility management), resulting in 4G network access failure for the 3G roamer. The present disclosure describes solutions that enable 3G users from the home network with 4G capable handsets to access 4G visited networks and enjoy the fast data services from 4G even if its home network has not yet provided 4G services.

Currently, the issue of enabling 3G roamers using 4G visited service lies in many factors of differences between 3G and 4G networks. One of the factors is the signaling used for mobility management in typical GSM cellular networks. In 3G networks, MAP (Mobile Application Part), an SS7 based signaling protocol, is used between visited and home 3G networks, while in 4G, Diameter, an IP based signaling protocol, is used between visited and home 4G networks. In order for 3G users to use a visited 4G network, signaling conversion between 4G at the visited network and the 3G home network is needed.

Another factor of the differences is that the user profile at the 3G home network in the HLR is different from the user profile in 4G HSS. While signaling conversion noted above can help mobile management signaling in a 4G visited network to understand its corresponded signaling from the 3G home network, further conversion inside signaling payload is needed to ensure the required user profile information elements carried by the converted Diameter signaling meet the needs from visited 4G network service elements (e.g., the visited 4G network MME) in order for visited 4G network granting the 3G roamer to access its local 4G services.

Thus, there is a need to enable 3G roamers from 3G home networks to access data services when roaming in a 4G visited network. More generally, there is a need for the capability to enable roamers from one generation of home network to access data services while roaming in another generation visited network.

According to at least one example embodiment, a method and system enables such 3G users roaming into a 4G visited network to access the 4G network as if they were 4G users at home, provided that the user equipment supports 4G access protocols.

According to an example embodiment, a method includes receiving, from a visited network having a first wireless network type, a first update location request message according to a first signaling protocol, the first update location request message associated with a user equipment roaming at the visited network. The first update location request message is converted to a second update location request message according to a second signaling protocol and transmitted to a home network associated with the user equipment, the home network having a second wireless network type. An update location response message according to the second signaling protocol is received from the home network, the update location response message including a user profile associated with the second wireless network type. A combined user profile is generated based on a user profile associated with the first wireless network type and the user profile associated with the second wireless network type. The combined user profile is transmitted to the visited network in an update location answer message according to the first signaling protocol.

The first signaling protocol may be Diameter signaling and the second signaling protocol may be mobile application part (MAP) signaling.

In an embodiment, the user profile associated with the first wireless network type may be retrieved from a database.

In an embodiment, generating the combined user profile may include adding to, changing, or deleting some or all of the user profile associated with the second wireless network type based on the user profile associated with the first wireless network type.

In an embodiment, the first update location request message may originate from a mobility management entity (MME) at the visited network and a serving general packet radio service (GPRS) support node (SGSN) global title (GT) may be assigned to the MME from a pool of GTs for MMEs associated with the visited network.

In an embodiment, transmitting the combined user profile to the visited network in the user location answer message according to the first signaling protocol may include using the MME address which corresponds to the GT assigned.

In an embodiment, the first wireless network type is fourth-generation (4G) and the second wireless network type is third-generation (3G).

According to another embodiment, a network device includes a processor and a memory with computer code instructions stored thereon, the processor and the memory, with the computer code instructions, configured to cause the network device to: (a) receive, from a visited network having a first wireless network type, a first update location request message according to a first signaling protocol, the first update location request message associated with a user equipment roaming at the visited network; (b) convert the first update location request message to a second update location request message according to a second signaling protocol; (c) transmit the second update location request message to a home network associated with the user equipment, the home network having a second wireless network type; (d) receive, from the home network, an update location response message according to the second signaling protocol, the update location response message including a user profile associated with the second wireless network type; (e) generate a combined user profile based on a user profile associated with the first wireless network type and the user profile associated with the second wireless network type; and (f) transmit the combined user profile to the visited network in an update location answer message according to the first signaling protocol.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Mobile technology experienced rapid evolution with deployment of packet-based infrastructures. An all-IP (Internet Protocol) mobile network based on LTE technology, also called a 4G mobile network, significantly increases the mobile data usages and experiences compared with those of 3G mobile networks, which is why so many mobile operators around the globe want to update their 3G network to 4G, due to its speed, all IP and common protocols and standards. However, the deployment of 4G in each country or region is not at the same speed as expected due to regional regulations and availability of spectrum, and so on. Therefore, there is a need to ensure 3G users at home can roam into 4G networks and be able to access data services.

Figure 1:
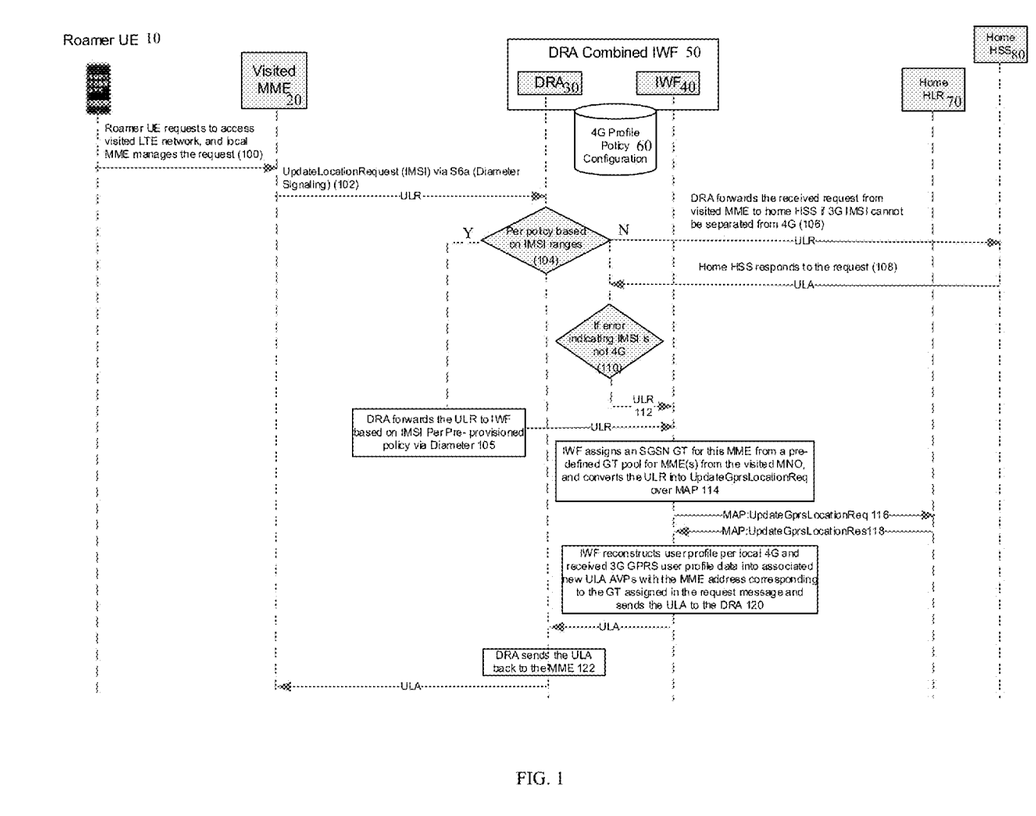
FIG. 1 is a block diagram illustrating example signaling flows between a visited network and a home network.

FIG. 1 is a block diagram illustrating example signaling flows between a visited 4G network and 3G HLR (Home Location Register) 70 or 4G HSS (Home Subscriber Server) 80 at a home network via an example embodiment of a combined interworking system 50 which includes a logical DRA (Diameter Routing Agent) 30, IWF (Inter Working Function) 40 and database 60 for 4G profile, policies and configuration.

In the signaling flow, a 3G roaming user UE (User Equipment) 10 sends a signaling request 100 to a service element MME (Mobile Management Entity) 20 to access a visited 4G LTE network. The MME 20 in the visited 4G LTE network sends an Update Location Request (ULR) message 102 via S6a Diameter signaling to the combined interworking system 50. The ULR message 102 includes an IMSI (International Mobile Subscriber Identity) number. The IMSI is a globally-unique code number that identifies a subscriber to the network. The DRA 30 at the combined interworking system 50 first accesses the database 60 to check the IMSI embedded in the received ULR message 102 against a policy specification to determine 104 how and where to forward the received message based on IMSI ranges specified in the policy specification.

In one scenario, the IMSI cannot be distinguished between 3G and 4G users, in which case the DRA 30 forwards 106 the received ULR message 102 to a home HSS 80. At the home HSS 80, if the user is a 3G user and not provisioned in the HSS 80, a response 108 is sent back to the combined interworking system 50 with an appropriate error code, indicating the user's status. The combined interworking system 50 determines at 110 if the error code in the received response 108 indicates that the IMSI is not a 4G user, in which case the DRA 30 reroutes the original received message 102 to the IWF 40 as ULR message 112, where a set of actions are performed and a SS7 (Signaling System No. 7) based message is sent to home 3G HLR 70, as described further herein below. In the case in which the combined interworking system 50 determines at 110 that the user is a 4G user, the normal response is sent back to the MME 20 at the visited network as normal signaling flow without involving the IWF 40. For simplicity, this latter signaling is not shown in FIG. 1.

In another scenario, the IMSI is distinguishable per the local policy, in which case the DRA 30 forwards the received ULR message 102 to the IWF 40 at 105, where a set of actions are performed and a SS7 based message is sent to the home 3G HLR 70 for further process accordingly.

Upon received a 4G signaling message from the DRA 30, the IWF 40 at 114 dynamically assigns a serving general packet radio service (GPRS) support node (SGSN) global title (GT) to the MME 20 from a pool of GTs for MMEs associated with the visited network (mimicking the 4G MME as an SGSN in the 3G network) and converts the ULR message 102 into an UpdateGPRSLocationReq message 116. The UpdateGPRSLocationReq request message 116 is sent to the home HLR 70 via a 3G SS7 signaling network using MAP (mobile application part) protocol. An UpdateGPRSLocationRes response message 118 containing a 3G GPRS user profile is sent back to the IWF 40 from the home HLR 70 via the SS7 signaling network using MAP. Upon received the response message 118 from the home HLR 70, the IWF 40 at 120 generates a combined user profile based on the received 3G GPRS profile and a local 4G profile accessed by the IWF 40 from database 60. In particular, the IWF 40 reconstructs the combined user profile into associated new attribute-value pairs (AVPs) with the MME address corresponding to the GT assigned in the request message and sends an Update Location Answer (ULA) message back to the DRA 30, where the newly reconstructed ULA is sent back at 122 to the MME 20 in the visited 4G network to complete the 4G signaling cycle.

According to an example implementation, the signaling messages are based on the Diameter protocol and/or MAP protocol. However, a person of ordinary skill in the art should appreciate that other types of signaling message, e.g., other than Diameter protocol or MAP protocol, may be employed.

As noted above, the DRA 30 accesses database 60 to retrieve a 4G user profile for the user identified by the IMSI. An example of the Information Element contained in the 4G user profile that is not present in Release 7 HLR in 3G is the "APN-Configuration-Profile." The APN-Configuration-Profile contains a Context-Identifier which identifies the default APN-Configuration, and a list of APN-Configurations, each identified by a Context-Identifier, as described in 3GPP TS 29.272[81] and 3GPP TS 29.273 [78]. The default APN configuration (default APN) is permanent data normally residing at the home HSS; in the system of the present disclosure, this data is part of the 4G profile stored in database 60 and accessed by the combined interworking system 50. Since this data is an example of AVPs missing from the home HLR in the received UpdateGPRSLocationRes message 118, the IWF 40 rebuilds the profile and adds the missing AVPs, and may include the 3G AVPs in the ULA 122 to ensure the required AVP by MME 20 with correct values for 3G home MNO provisioned at the DRA/IWF 50.

Other non-limiting examples of Information Elements contained in the 4G user profile that are not present in Release 7 HLR in 3G include EPS-Subscribed-QoS-Profile, containing bearer-level QoS parameters (QCI and ARP) associated to the default bearer for an APN (3GPP TS 23.401) and Subscribed-APN-AMBR, the maximum aggregated uplink and downlink MBRs (Maximum Bit Rate) to be shared across all Non-GBR bearer, which are established for the APN. Other mismatched information elements, according to 3GPP TS 23.008, can be mediated with the same mechanism described herein.

Figure 2A:
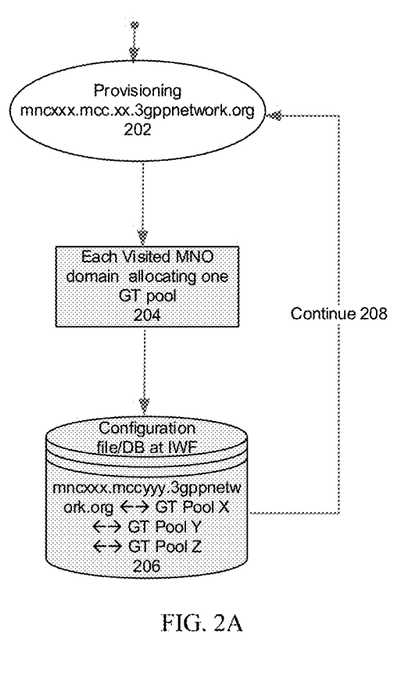
FIG. 2A is a flow diagram illustrating example logic routing and mapping provisioning.

FIG. 2A shows an example logic process at the IWF 40 for provisioning routing and mapping information in the system for visited 4G networks and 3G home networks. In one embodiment, a visited 4G network's domain name, such as mncxxx.mccxxx.3gppnetwork.org is needed for the system to recognize the visited network realm presented in all related signaling messages 202. For each visited network domain or realm, a Globe Title (GT) address pool, well-known signaling address used in SS7, is allocated to represent as 3G service elements corresponding to its 4G service element, such as GT address as a visited SGSN that is used to represent an MME in the visited network to communicate with 3G home network 204. Such GT pool and mapping to a visited LTE operator's domain is to be saved in a file or Database (206) as a table format. The process continues 208 the same provisioning for each visited network that may need to communicate with the one 3G home network.

Figure 2B:
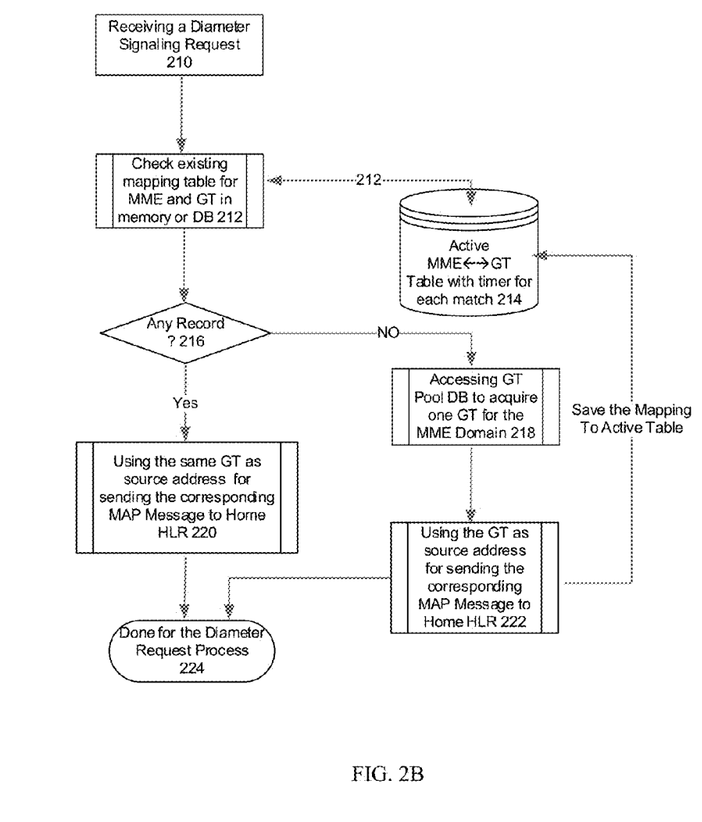
FIG. 2B is a flow diagram illustrating a first example logic routing process.

FIG. 2B is an example logic routing process at the IWF 40 implemented when receiving a Diameter Signaling Request such as ULR message 112 (FIG. 1). In an embodiment, the IWF 40 checks at 212 the existing mapping table to see if there is mapping of a visited service address under the provisioned visited network domain or realm with an allocated GT address from the associated GT pool from an active database or a file used for recording the mapping and configurations. If there is a record found at 216, the existing timer for the mapping record is reset, and it continues at 220 to use the existing GT for mapping the service element from the visited network and proceeds to send the converted message to the 3G home network 224. If there is no record at 216, which means a new request arrived, the IWF 40 assigns at 218 a GT from the pre-provisioned GT Pool for the visited service element, uses at 222 the GT as the source address for sending the converted message to the 3G home network at 224. Meanwhile a new mapping record is updated in the active database at 214 with an expiration timer set.

Figure 2C:
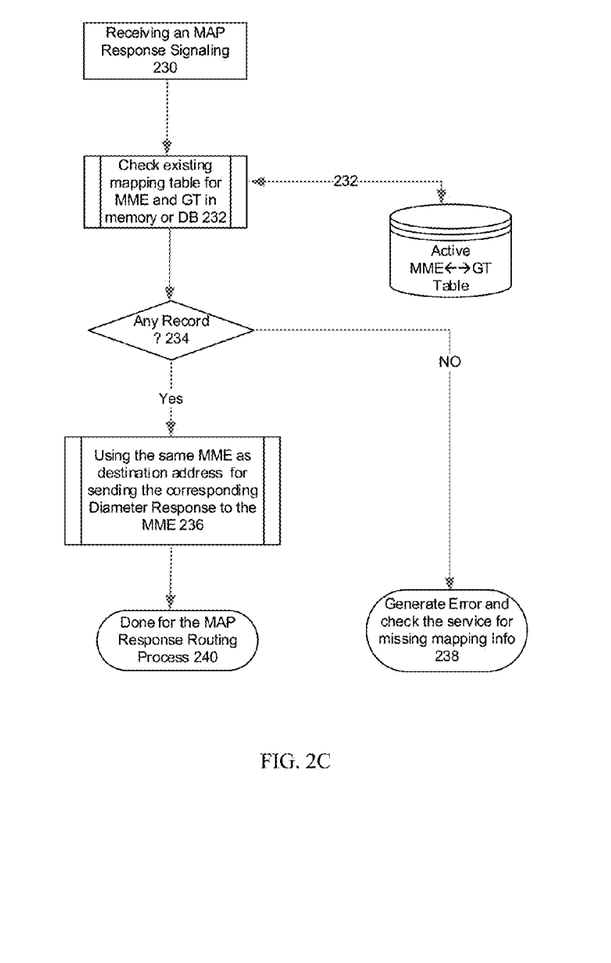
FIG. 2C is a flow diagram illustrating a second example logic routing process.

FIG. 2C is an example logic routing process at the IWF 40 implemented when receiving a MAP message from a 3G home network over an SS7 signaling network, e.g., UpdateGPRSLocationRes message 118 (FIG. 1). In an embodiment, the IWF 40 receives the MAP message at 230 and at 232 checks the existing mapping table from the active database or a file to see if there is an existing record of mapping between the received GT address and the destination service address for the visited network in the format of FQDN (Full Qualified Domain Name) using the domain or realm name provisioned in the system. If there is a record found at 234, which means the previous service element from the visited network is still active, either waiting for a response or ready for receiving a new request, the IWF 40 uses the found address (FQDN) to proceed with reconstructing the 4G signaling message based on the local 4G profile and the received 3G user profile embedded in the received MAP message, and sends the constructed 4G signaling message to the service element in the visited network via 4G Diameter signaling network 236, 240. At the same time, the existing timer for the mapping record is reset. If there is no record found at 234, which means the received MAP message from 3G home HLR 70 is not appropriate for further processing, an error message is generated to the 3G home network. Further verification in the provisioning process may be included to ensure correct GT pool is assigned to the visited network and the 3G home network 238.

Figure 3:
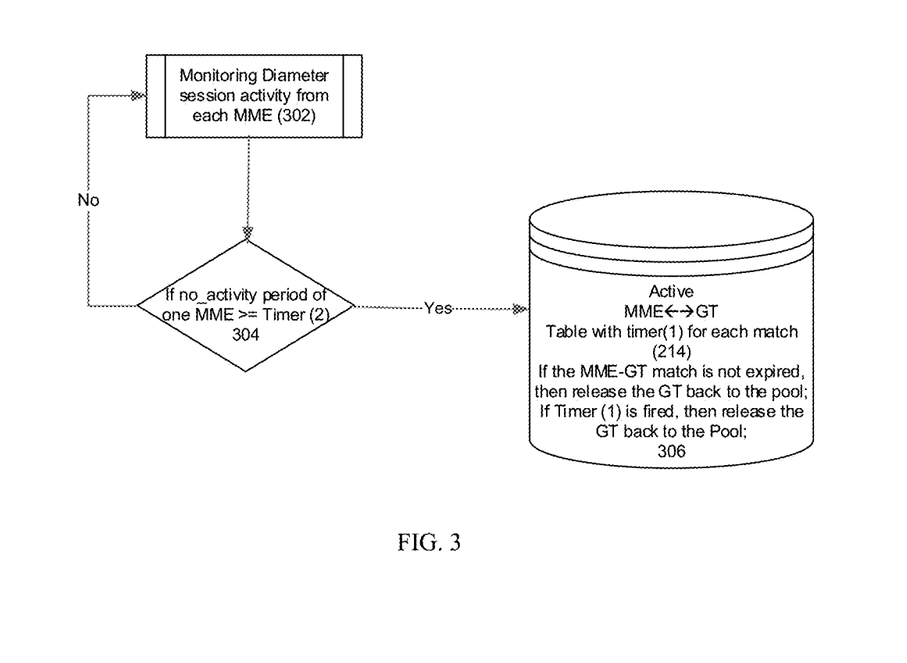
FIG. 3 is a flow diagram illustrating an example releasing process.

FIG. 3 describes an example process of releasing a GT back into the GT pool for other service elements in a visited network to use. In one embodiment, there is a process of monitoring Diameter session activity of each service element from a visited network 302. If there is a period of non-activity, which may mean that no Diameter Session either initiated from or bound to a service element represented as FQDN in a visited network, that is larger than a pre-defined value, e.g., timer (2), then the active database for the mapping table is notified where further action is taken place to reflect the monitoring information 304. For example, the existing GT can be released back to the pool even the timer (1) is still not fired. If the time period of no activity is less than the timer (2), then reset the timer (2) and continue to monitor the activity of the targeted service element in the visited network.

In another embodiment, there are several ways of releasing the GT in the active mapping table indicated in 306, including: (a) if the timer (1) is fired up without receiving any information with timer (2), meaning there is no activity from existing used mapping, the GT can be released to its GT Pool; (b) if timer (1) is not fired up, and receiving the update from 304 with timer (2), meaning there is no signaling activity from the visited network, the associated GT can be released to its GT Pool per policy, resulting in flexible control on the GT usage.

It should be understood that the example embodiments described above may be implemented in many different ways. In some instances, the various DRA, IFW, "data processors" or networking devices described herein may each be implemented by a physical or virtual general purpose computer having a central processor, memory, disk or other mass storage, communication interface(s), input/output (I/O) device(s), and other peripherals. The general purpose computer is transformed into the processor and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   (a) receiving, from a visited network having a first wireless network infrastructure type that employs a first signaling protocol, a first update location request message according to the first signaling protocol, the first update location request message originating from a mobility management entity (MME) at the visited network and associated with a user equipment roaming at the visited network;
   (b) assigning a serving general packet radio service (GPRS) support node (SGSN) global title (GT) to the MME from a pool of GTs for MMES associated with the visited network and converting the first update location request message to a second update location request message according to a second signaling protocol;
   (c) transmitting the second update location request message to a home network associated with the user equipment, the home network having a second wireless network infrastructure type that employs the second signaling protocol;
   (d) receiving, from the home network, an update location response message according to the second signaling protocol, the update location response message including a user profile associated with the second wireless network infrastructure type;
   (e) generating a combined user profile based on a user profile associated with the first wireless network infrastructure type and the user profile associated with the second wireless network infrastructure type; and
   (f) transmitting the combined user profile to the visited network in an update location answer message according to the first signaling protocol using the MME address which corresponds to the GT assigned.

2. The method as recited in claim 1, further comprising determining whether the user equipment is associated with the first wireless network infrastructure type or the second wireless network infrastructure type.

3. The method as recited in claim 2, further comprising executing steps (b) through (f) only if the user equipment is associated with the second wireless network infrastructure type.

4. The method as recited in claim 2, wherein determining is based on a user identifier associated with the user equipment embedded in the first update location request message.

5. The method as recited in claim 1, wherein the first signaling protocol is Diameter signaling and the second signaling protocol is mobile application part (MAP) signaling.

6. The method as recited in claim 1, further comprising retrieving the user profile associated with the first wireless network infrastructure type from a database.

7. The method as recited in claim 1, wherein generating the combined user profile includes adding to, changing, or deleting some or all of the user profile associated with the second wireless network infrastructure type based on the user profile associated with the first wireless network infrastructure type.

8. The method as recited in claim 1, further comprising releasing the GT to the pool.

9. The method of claim 1, wherein the first wireless network infrastructure type is fourth-generation (4G) and the second wireless network infrastructure type is third-generation (3G).

10. A network device comprising:
    a processor; and
    a memory with computer code instructions stored thereon, the processor and the memory, with the computer code instructions, configured to cause the network device to:
    (a) receive, from a visited network having a first wireless network infrastructure type that employs a first signaling protocol, a first update location request message according to the first signaling protocol, the first update location request message originating from a mobility management entity (MME) at the visited network and associated with a user equipment roaming at the visited network;
(b) assign a serving general packet radio service (GPRS) support node (SGSN) global title (GT) to the MME from a pool of GTs for MMES associated with the visited network and convert the first update location request message to a second update location request message according to a second signaling protocol;
(c) transmit the second update location request message to a home network associated with the user equipment, the home network having a second wireless network infrastructure type that employs the second signaling protocol;
(d) receive, from the home network, an update location response message according to the second signaling protocol, the update location response message including a user profile associated with the second wireless network infrastructure type;
(e) generate a combined user profile based on a user profile associated with the first wireless network infrastructure type and the user profile associated with the second wireless network infrastructure type; and
(f) transmit the combined user profile to the visited network in an update location answer message according to the first signaling protocol using the MME address which corresponds to the GT assigned.

11. The network device as recited in claim 10, wherein the processor and the memory, with the computer code instructions, are configured to further cause the network device to determine whether the user equipment is associated with the first wireless network infrastructure type or the second wireless network infrastructure type.

12. The network device as recited in claim 11, wherein the processor and the memory, with the computer code instructions, are configured to further cause the network device to execute steps (b) through (f) only if the user equipment is associated with the second wireless network infrastructure type.

13. The network device as recited in claim 11, wherein determining is based on a user identifier associated with the user equipment embedded in the first update location request message.

14. The network device as recited in claim 10, wherein the first signaling protocol is Diameter signaling and the second signaling protocol is mobile application part (MAP) signaling.

15. The network device as recited in claim 10, wherein the processor and the memory, with the computer code instructions, are configured to further cause the network device to retrieve the user profile associated with the first wireless network infrastructure type from a database.

16. The network device as recited in claim 10, wherein generating the combined user profile includes adding to, changing, or deleting some or all of the user profile associated with the second wireless network infrastructure type based on the user profile associated with the first wireless network infrastructure type.

17. The network device as recited in claim 10, wherein the processor and the memory, with the computer code instructions, are configured to further cause the network device to release the GT to the pool.

18. The network device of claim 10, wherein the first wireless network infrastructure type is fourth-generation (4G) and the second wireless network infrastructure type is third-generation (3G).

19. A non-transitory computer-readable medium with computer code instructions stored thereon, the computer code instructions when executed by at least one processor cause an apparatus to:
(a) receive, from a visited network having a first wireless network infrastructure type that employs a first signaling protocol, a first update location request message according to the first signaling protocol, the first update location request message originating from a mobility management entity (MME) at the visited network and associated with a user equipment roaming at the visited network;
(b) assign a serving general packet radio service (GPRS) support node (SGSN) global title (GT) to the MME from a pool of GTs for MMES associated with the visited network and convert the first update location request message to a second update location request message according to a second signaling protocol;
(c) transmit the second update location request message to a home network associated with the user equipment, the home network having a second wireless network infrastructure type that employs the second signaling protocol;
(d) receive, from the home network, an update location response message according to the second signaling protocol, the update location response message including a user profile associated with the second wireless network infrastructure type;
(e) generate a combined user profile based on a user profile associated with the first wireless network infrastructure type and the user profile associated with the second wireless network infrastructure type; and
(f) transmit the combined user profile to the visited network in an update location answer message according to the first signaling protocol using the MME address which corresponds to the GT assigned.

* * * * *